Aug. 30, 1960 W. P. IANNUZZI ET AL 2,951,115

COLOR TELEVISION APPARATUS

Filed April 26, 1956 2 Sheets-Sheet 1

INVENTORS
GORDON E. KELLY &
WILLIAM P. IANNUZZI
BY
[signature]
ATTORNEY

INVENTORS
GORDON E. KELLY &
WILLIAM P. IANNUZZI
BY
[signature]
ATTORNEY 2,951,115
Patented Aug. 30, 1960

2,951,115

COLOR TELEVISION APPARATUS

William P. Iannuzzi and Gordon E. Kelly, Haddonfield, N.J., assignors to Radio Corporation of America, a corporation of Delaware Filed Apr. 26, 1956, Ser. No. 580,929

8 Claims. (Cl. 178—5.4)

Figure 1:
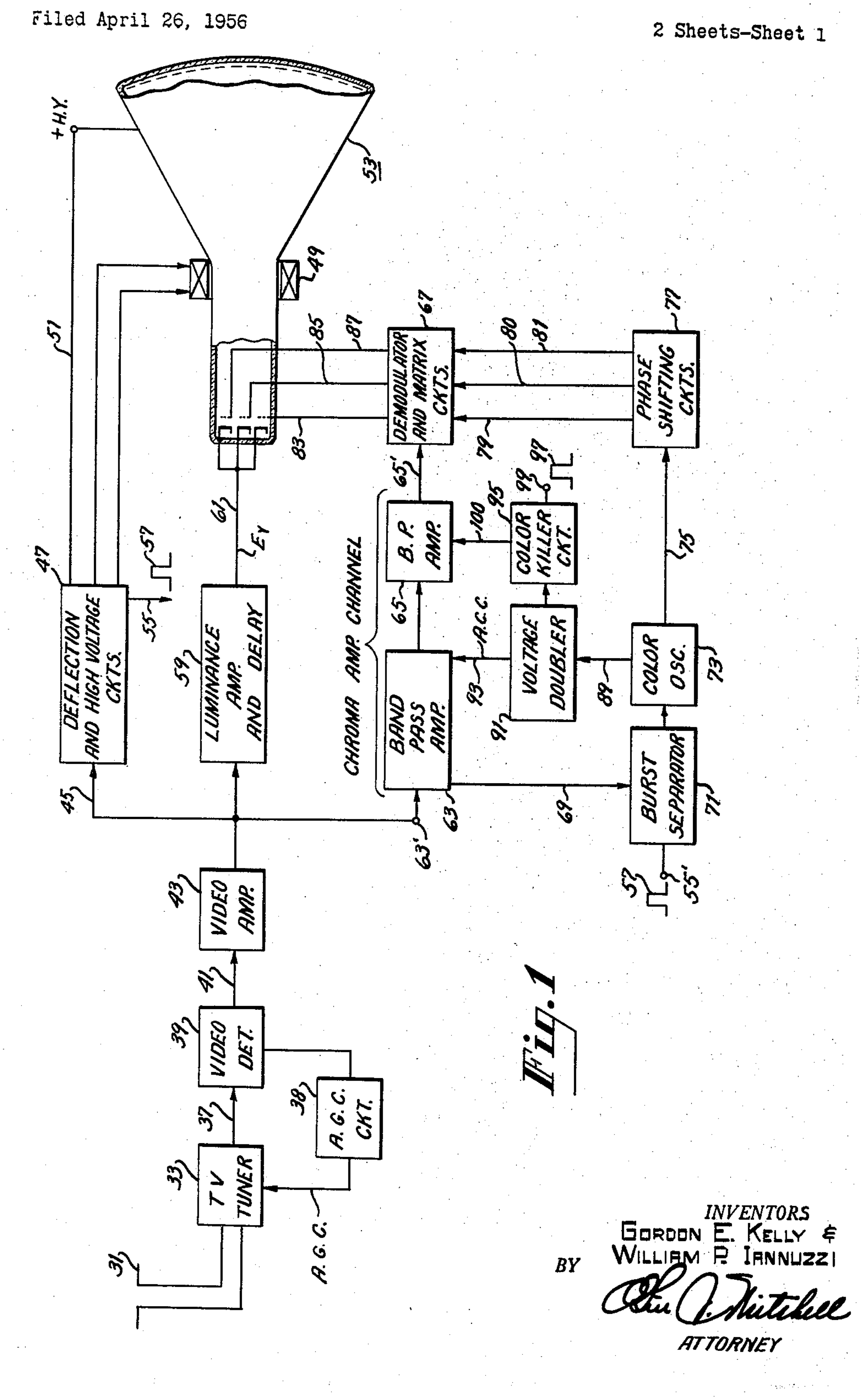

The present invention relates to new and improved apparatus for controlling the operation of color television receivers and, particularly, to control circuitry for controlling the color signal processing circuits of such receivers.

In accordance with the color television standards promulgated by the Federal Communications Commission on Dec. 17, 1953, the transmitted composite color television signal includes, in addition to scanning synchronizing information in the form of pulses, a luminance signal which is indicative of the brightness of elemental areas of the image being televised and a chrominance signal in the form of a phase- and amplitude-modulated subcarrier wave which is representative of the hue and saturation of the image. The sub-carrier wave has a nominal or mean frequency of approximately 3.58 mcs. In order to detect the color information, it is necessary to provide some form of demodulating apparatus in the receiver, which apparatus may comprise synchronous demodulating circuitry serving to compare the incoming subcarrier wave with a locally produced color reference subcarrier wave. Synchronization of the receiver color reference oscillator is accomplished through the use of a color reference "burst" transmitted periodically with the composite signal, the burst being a plurality of cycles of the frequency of the subcarrier wave and of reference phase. In accordance with the standards mentioned above, a burst of subcarrier wave energy is superimposed on the "back porch" of each horizontal blanking pulse.

Since, in the reconstruction of the television image at the receiver, the saturation of the image is dependent upon the amplitude of the chrominance signal or subcarrier information, it is important that the gain of the receiver be controlled in such manner as to insure proper amplitude of the chrominance signal with respect to the luminance signal. Such control has been termed and will be referred to herein as "chroma control."

Moreover, in order that the receiving apparatus designed for color television image reproduction may also serve to reproduce high quality black and white pictures when receiving ordinary monochrome signals, the receiver may be arranged in such manner as to arrest or disable the color demodulating circuits when monochrome television signals are being received. Such an arrangement is termed a "color killer circuit" and will be so designated herein.

It is an object of the present invention to provide new and improved apparatus for affording the requisite information for the automatic chroma control and color killer functions of a color television receiver.

In general, the present invention comprises means for deriving, from the control grid circuit of the color reference oscillator to which is applied a continuous alternating voltage wave derived from received bursts, a voltage proportional to the amplitude of the received synchronizing bursts. Specifically, the invention includes a voltage doubling arrangement for affording an increased amplitude of control voltage over that normally available through grid current rectification by the oscillator circuit. In accordance with a specific form of the invention, the color reference oscillator is synchronized with the received bursts through an injection-locking arrangement wherein separated bursts are injected into a filter which applies a continuous wave to the control grid of the oscillator. Through a grid current detecting process, the oscillator circuit detects the positive-going peaks of the subcarrier frequency wave at that point, the amplitude of which wave varies as the amplitude of the received bursts, while an additional voltage doubler rectifier is connected to the oscillator control grid circuit in such manner as to detect the negative peaks of the subcarrier wave. The output of the auxiliary rectifier is thus additively combined with the voltage produced by grid current rectification to produce an output voltage of sufficient amplitude for controlling both the gain of the chrominance amplifier channel of the receiver for effecting automatic chroma control and the operation of the color killer circuit.

Figure 2:
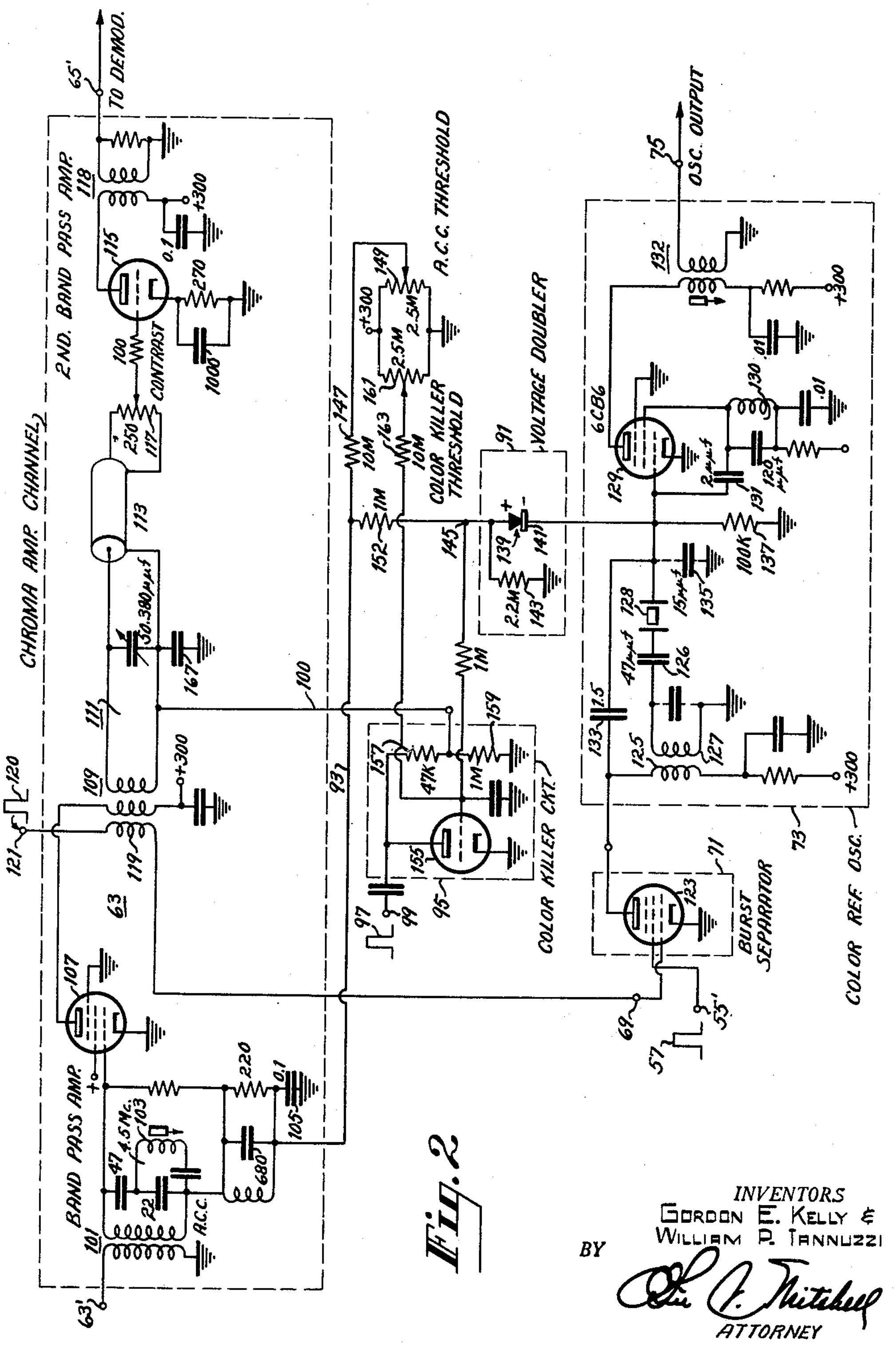

Additional objects and advantages of the present invention will become apparent to those skilled in the art from a study of the following detailed description of the accompanying drawings, in which:

Figure 1 is a block diagram of a color television receiver employing the principles of the present invention; and Figure 2 is a schematic diagram illustrating certain circuitry in accordance with a specific form of the invention.

There is shown in Figure 1 a block diagram of a color television receiver with which the present invention may be employed. An incoming carrier wave, amplitude-modulated by the composite color television signal, is intercepted by an antenna 31 and is applied to a tuner section 33 which includes radio frequency amplification stages, a mixer or first detector wherein the modulated carrier wave is translated in frequency to an intermediate frequency (IF) range and an IF amplifier. The amplified IF signals are applied via a lead 37 to a second or video detector 39 which provides at its output terminal 41 the detected composite color television signal including scanning synchronizing pulses, bursts of subcarrier energy (i.e., color synchronizing bursts) on the "back porch" of the horizontal blanking pedestals and a broad band of video signals including luminance and chrominance components. The gain of the IF amplifier stages of the tuner 33 is automatically controlled by a conventional AGC circuit 38.

The composite signal thus recovered from the video detector 39 is amplified in a broad band video amplifier stage 43 and is applied simultaneously to several channels of the receiver, as follows: the signal is applied via a lead 45 to the deflection and high voltage circuits 47 comprising suitable means for generating scanning sawtooth current waves of television line and field frequencies for application to the electromagnetic deflection yoke 49. In a well known manner, the flyback voltage pulses produced in the horizontal deflection circuit are rectified to produce a high, unidirectional positive potential for application via a lead 51 to the final anode of the tri-color kinescope 53. Also produced by the deflection circuits 47 and provided at the terminal 55 are burst gating pulses 57 corresponding in time to the horizontal flyback pulses and having a duration corresponding substantially to that of the color synchronizing burst referred to above. The gating pulses 57 may be produced, for example, through the agency of a flyback winding on the horizontal deflection output and high voltage transformer forming a part of the horizontal deflection circuit.

The luminance signal component of the composite received television signal is applied from the video amplifier 43 to a luminance amplifier and delay circuit represented by the block 59 which provides at its output terminal 61 the luminance signal $E_Y$ for application to the cathodes of the color image reproducing kinescope 53.

The composite color television signal is also applied to a chrominance amplifier 63 which has associated therewith a bandpass filter which serves to separate the subcarrier wave or chrominance signal information from the composite signal. The amplified chrominance signal is, in turn, applied via a second chrominance bandpass amplifier 65 to the demodulator and matrix circuit 67. The demodulators and matrix 67 may be understood as performing a process of synchronous demodulation upon the chrominance signal to derive therefrom the "color-difference" signals employed in modulating the phase and amplitude of the subcarrier wave at the transmitter. A detailed discussion of the operation of such circuitry may be found in an article entitled "Color Television Signal Receiver Demodulators" by D. H. Pritchard and R. N. Rhodes, June 1953 issue of the RCA Review.

The demodulating action requires the provision of subcarrier frequency waves of fixed phase with respect to a reference, which waves may be derived from a color reference oscillator 73 producing a continuous 3.58 mcs. wave and synchronized as to phase and frequency by the color synchronizing bursts accompanying the composite signal. Specifically, the composite signal is applied from the output of the first bandpass amplifier 63 via a lead 69 to a burst separator circuit 71 which receives from the terminal 55 of the deflection circuits the burst gating pulses 57 which are applied to the burst separator circuit via the terminal 55'. The separated color synchronizing bursts are employed in synchronizing the operation of the color reference oscillator 73 in a manner to be described hereinafter. The output wave from the oscillator 73 may be applied via a lead 75 to a phase shifting circuit 77 which provides, at its output leads 79, 80 and 81, subcarrier waves of fixed phase with respect to the phase of the reference burst for application to the demodulators and matrix contained within the block 67. Through the process of synchronous demodulation, the circuit 67 produces the color-difference signals R–Y, G–Y and B–Y, where R, G and B represent the component color signals and Y represents the luminance signal. The color-difference signals from the demodulators in the circuit 67 are applied to the beam intensity controlling electrodes of the color kinescope 53 via the leads 83, 85 and 87, respectively, so that the kinescope serves to combine the color-difference signals with the luminance signal in such manner that the intensities of the respective beams of the kinescope are controlled in accordance with the component colors of the image being reproduced.

As thus far described, the receiver of Figure 1 is entirely conventional and does not, per se, form a part of the present invention. As is shown in the figure, however, a control voltage is derived from the color reference oscillator 73 and is applied via a lead 89 to a voltage doubler circuit 91. The output of the voltage doubler circuit is applied as an automatic chroma control voltage (ACC) via a lead 93 to the bandpass amplifier 63 for controlling its gain in such manner as to maintain the amplitude of the chrominance signal constant with respect to the luminance signal being processed in the channel 59. The output of the voltage doubler is also applied to a color killer circuit 95 which is rendered operative periodically by pulses 97 applied to its input terminal 99. These keying pulses 97 may be derived from any suitable source such as the flyback transformer forming a part of the horizontal deflection circuit of the receiver. The color killer circuit is coupled to the bandpass amplifier 65 via a lead 100 in such manner as to render the chrominance amplifier channel inoperative during the reception of a monochrome television signal lacking the color synchronizing bursts or a signal in which the chrominance information is below a predetermined level, as evidenced by burst amplitude. That is to say, variations in amplitude of the bursts received by the oscillator 73 reflect variations in the amplitude of the chrominance signal being processed by the receiver by reason of the fact that the bursts are of color subcarrier wave frequency.

The arrangement by which a control voltage is derived from the oscillator 73 and doubled prior to use in the automatic chroma control and color channel disabling functions will be described in detail hereinafter. Figure 2 is a schematic diagram of one type of circuit illustrating the chrominance amplifier channel of Figure 1, the color killer 95, the burst separator 71 and the burst-synchronized oscillator 73 of Figure 1.

In the chroma amplifier channel, the color television signal is applied to the input terminal 63' and appears across the bandpass filter 101. The bandpass filter 101 has a bandpass from approximately 2 to 4.2 mcs. if high frequency color information is to be demodulated by the demodulator channel 75, or from 3 to 4.2 mcs. if lower frequency color information is to be demodulated. The coil 103 is a resonant circuit which is used to trap sound information at approximately 4.5 mcs. The bandpass filter 101 is bypassed to ground by the bypass condenser 105, and connected therefrom to the control grid of the tube 107. The tube 107 is part of the bandpass amplifier 63 and is responsive to the frequency range of the color television signal developed across the bandpass filter 101 so that the amplified chrominance signal appears across the output coil 109.

The chrominance signal thus developed across the coil 109 is coupled to the circuit 111 and passed by way of the coaxial line 113 to the control grid of the triode 115 which forms part of the amplifier 65 of Figure 1. Application of the signal to the control grid of triode 115 may be accomplished via a potentiometer 117 which provides contrast control. The chrominance signal, amplified when present by the triode 115, appears across the output circuit 118 at the output terminal 65'. The chrominance signal is coupled from the terminal 65' to the demodulator channel 67. It is to be noted that the D.-C. bias voltages for the control grids of the chrominance amplifier tubes 107 and 115 are derived, respectively, from the output leads 93 and 100 of the voltage doubler 91.

The tube 107 of the chrominance amplifier channel also develops the color synchronizing bursts across coil 109 during the portion of the retrace interval following the horizontal synchronizing pulse. Through the agency of the coil 119, which is inductively coupled to the coil 109, each color synchronizing burst is pedestaled on a pulse 120 which occurs during burst time and which is applied to the terminal 121 from a source such as the horizontal deflection circuit. The resultant pedestaled burst is applied to a control grid of the tube 123 of the burst separator 71 which is normally non-conductive. At the same time the gating pulse 57 from the terminal 55 is applied via the terminal 55' to a second control grid of the tube 123. Since the color synchronizing burst and the keying pulse 57 occur generally in coincidence, the burst separator tube 123 conducts only during burst time so that the burst is separated from the remainder of the chrominance signal. The separated burst thus is caused to appear across the inductance 125 which is the burst input circuit of the burst synchronized oscillator 73.

An inductance 127, inductively coupled to the inductance 125, applies the separated bursts to the piezo-electric crystal 128 of the oscillator circuit 73 via a capacitor 126. The color synchronizing burst is filtered by the crystal 128 and transformed into a ringing signal which is applied to the first control grid of the tube 129. The tube 129 is coupled to provide feedback from its screen grid to the first control grid by way of a resonant circuit 130 and the bypass condenser 131, so that oscillation occurs, which oscillation is synchronized by the burst-induced ringing signal from the crystal 128. The burst synchronized oscillations are thereupon developed at the output circuit 132 which is responsive to oscillations impressed on the anode of the tube 129 and are applied to the output lead 75.

A capacitor 133 provides a neutralizing path from the anode side of the inductance 125 to the control grid of the tube 129 to provide a coupling for burst voltage from the inductance 125 to the first control grid of the tube 129 of proper phase to neutralize, at the first control grid, any burst sidebands passing through any shunt capacitance of the crystal 128.

Although the specific oscillator 73 shown in detail in Figure 2 does not, per se, form a part of the present invention, certain aspects of its operation should be noted. Insofar as the crystal 128 is concerned, the circuit may be considered as one in which the inductive winding 127 constitutes an induction generator whose inductive impedance is in series with the capacitor 126, the primarily inductive impedance of the crystal 128 and the input capacity 135 of the oscillator tube 129 which may, for example, comprise a capacitance of 15 M.M.F. The circuit may thus be understood as a series resonant circuit at the color subcarrier wave frequency, such that when the burst is applied from the inductance 127 to the crystal, the reactive components series resonate to produce a substantially continuous wave at the subcarrier wave frequency. By virtue of the high Q of the crystal, it forms a highly selective filter circuit which enhances the noise immunity of the oscillator. The continuous wave produced on the control grid of the tube 129 by the ringing circuit just described adds in phase with the oscillator energy feedback to that point from the screen grid of the tube via the network 130 and capacitor 131. The resultant voltage at the control grid of the tube 129 is, therefore, a continuous wave of subcarrier frequency whose amplitude varies as a function of the amplitude of the bursts provided by the burst separator circuit 71 to the crystal circuit of the oscillator. For example, in the circuit shown in Figure 2, the amplitude of the continuous wave energy at the control grid of the oscillator tube may vary from 8 volts peak-to-peak when no burst is supplied by the circuit 71 to 30 volts peak-to-peak when bursts of normal amplitude are supplied to the oscillator.

It will further be noted that the control grid of the oscillator tube 129 is connected to ground via a grid leak resistor 137. Depending upon the amplitude of the continuous wave present at the control grid of the oscillator tube, that tube will draw grid current in varying degrees proportional to the continuous wave amplitude. The actual amplitude of the output wave provided by the oscillator tube to the circuit 132, however, should remain substantially stable despite variations in amplitude of the applied ringing voltage from the crystal circuit. Such stability may be provided for through a selection of value of the grid leak resistor 137, the value of 100 k. shown in the drawing being a proper one for the circuit illustrated.

Since, as stated, the oscillator tube 129 is driven into grid current by the positive-going peaks of the continuous wave of voltage on its control grid, a direct current voltage negative polarity is produced at the lead 89 connected to the control grid of the tube. This voltage will, moreover, vary in amplitude as a function of variations in the amplitude of the ringing voltage produced by the crystal circuit, which amplitude variation, in turn, is a function of the amplitude of the bursts applied to the inductive winding 127. Thus, if the amplitude of bursts supplied by the separator circuit 71 should decrease, the voltage at the lead 89 will become less negative. Conversely, an increased burst amplitude will result in a more negative direct current voltage at the lead 89.

While the direct current voltage thus produced by grid current rectification in the oscillator tube 129 is a sensitive indicator of the amplitude of bursts supplied at the oscillator ringing circuit and, therefore, the relative amplitude of the chrominance signal being processed by the chrominance amplifier channel of the receiver, means are provided in accordance with the present invention for further increasing the amplitude of the indicator voltage thus produced, such means being enclosed within the dotted line rectangle 91. Specifically, the voltage doubler 91 comprises means for detecting the negative peaks of continuous wave energy at the control grid of the oscillator tube 129, whereby to produce an additional direct current voltage which may be added to the direct voltage produced at the lead 89 by grid current rectification in the oscillator tube. A diode 139 having its cathode 141 connected to the control grid of the oscillator tube 129 and its anode connected through a load resistor 143 to ground affords the voltage doubling action. That is, while the positive-going peaks of the subcarrier frequency continuous wave on the control grid of the oscillator tube are detected by grid current rectification in that tube, the negative-going peaks of the wave cause the diode 139 to conduct, thereby to produce a negative voltage at the upper terminal of the resistor 143, which latter voltage adds to the voltage across the grid leak resistor 137. The direct current voltage thus available at the terminal 145 may range from 8 to 10 volts negative when no burst is applied to the crystal ringing circuit of the oscillator to 20 to 30 volts negative when bursts of normal amplitude are applied to the crystal circuit, which voltages are approximately twice the corresponding voltages available at the lead 89 and which are even more effective in controlling the color killer and automatic chroma control functions.

With respect to the automatic chroma control function of varying the gain of the chrominance amplifier channel generally inversely with respect to the amplitude of the bursts (and, therefore, the amplitude of the chrominance signal applied to the terminal 63′), it will be noted that the control grid of the chrominance bandpass amplifier tube 107 of the amplifier 63 is connected through the bandpass filter to the lead 93. The lead 93 is, in turn, connected through a high impedance path 147 to a point on a potentiometer 149 which provides an adjustable direct current voltage of positive polarity. This positive D.C. voltage from the potentiometer 149 is divided down by the resistors 147 and 152 to a relatively lower positive D.C. voltage (e.g., 10 volts) which is of the same order of magnitude as the negative D.C. voltage at the terminal 145, so that the potentiometer 149 may be adjusted initially as a threshold control to provide the requisite small negative D.C. bias at the lead 93 for the control grid of the amplifier tube 107, which voltage may, by way of illustration, be of the order of −1 volt D.C., for high gain operation of the amplifier tube.

In operation of the automatic chroma control circuit, should the amplitude of received bursts applied to the oscillator circuit increase, thereby indicating an increased amplitude of chrominance signal at the input of the chrominance amplifier channel, the voltage provided jointly by the grid rectification in the oscillator tube and the voltage doubler diode 139 will produce a more negative D.C. control voltage at the lead 93, thereby decreasing the gain of the amplifier tube 107 by the amount necessary for stabilizing the amplitude of the chrominance signal being processed in that channel. Conversely, a decreased burst amplitude results in a less negative D.C. control voltage at the lead 93, whereby the gain of the amplifier tube 107 is increased by the requisite amount.

The action of the color killer circuit 95 is similarly controlled by the voltage at the terminal 145 taken in conjunction with a positive threshold voltage. The color killer circuit shown by way of illustration comprises a triode 155 whose anode is connected to its cathode through a pair of series connected resistors 157 and 159. The control grid to cathode bias of the triode 155 is controlled, in part, by means of a potentiometer 161 which is connected to the control grid of the color killer tube via a large resistor 163. This color killer threshold potentiometer 161 thus supplies a fixed positive voltage to the control grid of the tube 155, which positive D.C. voltage is approximately equal to the negative D.C. voltage supplied by the voltage doubler diode at the terminal 145 when no bursts are present in the received signal. In this manner, the control grid of the color killer tube is the ground potential when no bursts are received, as in the case of a monochrome signal, and at a relatively high negative cut-off potential when the received signal contains bursts of predetermined amplitude. Since the anode of the color killer tube is, as stated, at the same potential as its cathode, the tube is normally non-conductive. Pulses 97 are applied to the anode input terminal 99 of the color killer tube at television line rate, however, and are of sufficient amplitude (e.g., +70 volts peak to peak) to tend to render the tube conductive during their application.

When a monochrome signal is being received, the bias on the control grid of the color killer tube is sufficiently near zero bias that the tube 155 conducts during the application of the pulses 97. Such current conduction is filtered by the resistors 157 and 159 and the capacitor 167 to produce at the lead 100 a negative D.C. voltage of sufficient amplitude to cut off the second bandpass amplifier 115, thereby disabling the chrominance signal channel. When, however, the received signal is a color television signal in which burst amplitude is sufficiently great, the voltage produced by the voltage doubler 91 maintains the grid of the color killer tube sufficiently negative that it is not rendered conductive by the keying pulses 97, so that the voltage at the lead 100 is maintained at its normal value (e.g., ground) for proper operation of the amplifier tube 115, thereby enabling the chrominance signal channel to operate in the desired manner.

A further advantage of the voltage doubler diode is that it tends to load the negative swings of the continuous wave on the control grid of the oscillator tube to which it is connected, thereby improving the noise immunity of the oscillator (i.e., against negative-going noise spikes), while not unduly loading the crystal 128 in such manner as to lower its Q undesirably. It will, therefore, be appreciated that the voltage doubler circuit of the present invention serves not only to provide an increased amount of control energy for use in the ACC and color killing actions in the receiver but also to improve the operation of the color reference oscillator with which it is associated.

Having thus described our invention, what we claim as new and desire to secure by Letters Patent is:

1. Automatic control apparatus for a television signal processing channel adapted to receive and process a television signal including periodic bursts of high frequency energy, which apparatus comprises: means for separating such bursts from a received signal; an electron discharge device having a control grid, a cathode and a further electrode; means connecting said device as a self-sustaining oscillator circuit whose nominal frequency is equal to that of such bursts; means coupled between said burst separating means and said device for applying between said control grid and cathode a substantially continuous wave of voltage controlled by such bursts and whose amplitude varies as a function of the amplitude of such bursts, circuit means connecting said control grid and cathode to rectify the said wave to produce a direct current voltage proportional to the amplitude of such wave; voltage doubling means comprising only one diode connected to said control grid for providing additional direct current voltage also variable as a function of the amplitude of such wave; and coupling means for applying the direct current voltage produced by said voltage doubling means to said channel for controlling the operation of said channel as a function of the amplitude of such bursts when present in a received signal.

2. The invention as defined by claim 1, said coupling means being so connected to said channel as to control the gain of said channel generally inversely as the amplitude of such bursts.

3. The invention as defined by claim 1, said coupling means being so connected to said channel as to render said channel operative only when bursts of a predetermined amplitude are present in a received signal.

4. The invention as defined by claim 1, said coupling means being so connected to said channel as to render said channel inoperative when such bursts are absent from a received signal and to vary the gain of said channel generally inversely as the amplitude of such bursts when present in a received signal.

5. Automatic control apparatus for a television signal processing channel adapted to receive and process a television signal including periodic bursts of high frequency energy, which apparatus comprises: means for separating such bursts from a received signal; an electron discharge device having a control grid, a cathode and a further electrode; means connecting said device as a self-sustaining oscillator circuit whose nominal frequency is equal to that of such bursts; a crystal ringing circuit operatively connected between said burst separating means and said device for applying a substantially continuous wave of energy of said frequency between said grid and cathode, said wave being controlled by such bursts, such that the amplitude of such wave varies as a function of the amplitude of such bursts, circuit means connecting said control grid and cathode to rectify the positive peaks of the wave applied to its control grid to produce a negative direct current voltage proportional to the amplitude of such wave; voltage doubling means comprising only one diode operatively connected to said control grid for providing additional direct current voltage also variable as a function of the amplitude of such wave; a gain control circuit in said channel; and means coupling said voltage doubler means to said gain control circuit for varying the gain of said channel generally inversely as the amplitude of such bursts.

6. Automatic control apparatus for a television signal processing channel adapted to receive and process a television signal including periodic bursts of high frequency energy, which apparatus comprises: means for separating such bursts from a received signal; an electron discharge device having a control grid, a cathode and a further electrode; means connecting said device as a self-sustaining oscillator circuit whose nominal frequency is equal to that of such bursts; a crystal ringing circuit operatively connected between said burst separating means and said device for applying a substantially continuous wave of energy of said frequency between said grid and cathode, said wave being controlled by such bursts, such that the amplitude of such wave varies as a function of the amplitude of such bursts, circuit means connecting said control grid and cathode to rectify the positive peaks of the wave applied to its control grid to produce a negative direct current voltage proportional to the amplitude of such wave; rectifying means comprising only one diode connected to said control grid for rectifying the negative peaks of such wave to produce additional direct current voltage also variable as a function of the amplitude of such wave and of the same sense as such first-named direct current voltage; and means for applying the direct current voltage from said rectifying means to said channel to vary the gain of said channel generally inversely as the amplitude of such bursts.

7. Automatic control apparatus for a television signal processing channel adapted to receive and process a television signal including periodic bursts of high frequency energy, which apparatus comprises: means for separating such bursts from a received signal; an electron discharge device having a control grid, a cathode and a further electrode; means connecting said device as a self-sustaining oscillator circuit whose nominal frequency is equal to that of such bursts; a crystal ringing circuit associated with said oscillator and operatively connected between said burst separating means and said control grid for applying a substantially continuous wave of energy of such frequency to said grid, said wave being controlled by such bursts, such that the amplitude of such wave is dependent upon the amplitude of such bursts, said oscillator including a grid-leak circuit arranged to rectify the positive peaks of such wave to produce a negative direct current voltage generally proportional to the amplitude of such wave; voltage doubler means including a rectifier circuit comprising only one diode operatively connected to said crystal ringing circuit for rectifying the negative peaks of such wave to produce an additional direct current voltage generally proportional to the amplitude of such wave; and means coupling said voltage doubler means to said channel for varying the gain of said channel generally inversely as the amplitude of such bursts.

8. In a color television receiver having a chrominance signal processing channel adapted to receive and process a color television signal including periodic bursts of high frequency energy, automatic control apparatus which comprises: means for separating such bursts from a received signal; an electron discharge device having a control grid, a cathode and a further electrode; means connecting said device as a self-sustaining oscillator circuit whose nominal frequency is equal to that of such bursts; a crystal ringing circuit operatively connected between said burst separating means and said device for applying a substantially continuous wave of energy of said frequency between said grid and cathode, said wave being controlled by such bursts, such that the amplitude of such wave varies as a function of the amplitude of such bursts, circuit means connecting said control grid and cathode to rectify the positive peaks of the wave applied to its control grid to produce a negative direct current voltage proportional to the amplitude of such wave; voltage doubling means comprising only one diode having an anode connected to a point of fixed potential and a cathode connected to said control grid for rectifying the negative peaks of such wave to provide additional direct current voltage also variable as a function of the amplitude of such wave; a gain control circuit in said channel; and means coupling said voltage doubler means to said gain control circuit for varying the gain of said channel generally inversely as the amplitude of such bursts.

References Cited in the file of this patent

UNITED STATES PATENTS

| | | |
|---|---|---|
| 2,735,886 | Schlesinger | Feb. 21, 1956 |
| 2,744,155 | Kihn | May 1, 1956 |

OTHER REFERENCES

RCA, Model CT-100, March 31, 1954, pages 31 to 34, Copy in Scientific Library.

Admiral, Introduction to Color Television, pages 24, 36 and 37 relied on. (Copy in Division 41.)

RCA, LB-811, December 5, 1950 (Figure 5). (Copy in Division 41.)